United States Patent [19]
Zimmermann et al.

[11] Patent Number: 5,080,379
[45] Date of Patent: Jan. 14, 1992

[54] MUFFLER HAVING A SHEET-STEEL SEAL

[75] Inventors: Helmut Zimmermann, Waiblingen; Michael Wissmann, Schorndorf-Weiler, both of Fed. Rep. of Germany

[73] Assignee: Andreas Stihl, Waiblingen, Fed. Rep. of Germany

[21] Appl. No.: 527,371

[22] Filed: May 23, 1990

[30] Foreign Application Priority Data

Jun. 1, 1989 [DE] Fed. Rep. of Germany ....... 3917870

[51] Int. Cl.⁵ ............................ F16L 51/04; F01N 7/18
[52] U.S. Cl. ................................. 277/236; 277/235 R; 277/235 B; 181/241; 181/243; 181/282
[58] Field of Search ........... 277/235 R, 235 A, 235 B, 277/236; 285/917; 181/227, 229, 232, 241, 243, 272, 273, 282

[56] References Cited

U.S. PATENT DOCUMENTS

| | | | |
|---|---|---|---|
| 1,609,283 | 12/1926 | Bailey | 277/236 |
| 3,285,632 | 11/1966 | Dunkle | 277/236 |
| 3,352,564 | 11/1967 | Johnson | 277/235 B |
| 3,520,544 | 7/1970 | Taylor | 277/236 |
| 3,698,840 | 10/1972 | Hover | 181/240 |
| 3,797,836 | 3/1974 | Halling | 277/236 |
| 4,109,751 | 8/1978 | Kabele | 181/272 |
| 4,175,754 | 11/1979 | Wilhelm | 285/917 |
| 4,834,399 | 5/1989 | Udagawa et al. | 277/235 B |

*Primary Examiner*—William A. Cuchlinski
*Assistant Examiner*—Daniel G. DePumpo
*Attorney, Agent, or Firm*—Walter Ottesen

[57] ABSTRACT

The invention is directed to a seal arranged between two housing parts of a muffler. The seal is configured essentially as a frame and made of sheet steel and has at least two layers. The first layer is defined by the frame itself and the second layer is defined by lugs which are folded over and are configured so as to be integral with the frame.

13 Claims, 5 Drawing Sheets

MUFFLER HAVING A SHEET-STEEL SEAL

FIELD OF THE INVENTION

The invention relates to a seal which is arranged between the two housing parts of a muffler and which is essentially configured as a frame.

BACKGROUND OF THE INVENTION

A muffler usually comprises two housing parts, namely two half-shells, which are joined with a seal being interposed therebetween. Such a seal must withstand high temperatures and compensate for unevenness at the sealing faces as well as withstand vibrations and gas pulsations of the muffler.

Experience has shown that the silicon seals or fiber seals normally used do not withstand the high temperatures which can be approximately 500° C. so that considerable leakage can develop even after a short operating time. The arrangement of copper seals is likewise not satisfactory since warpage occurring because of high temperatures can lead to leakage and mechanical wear occurs because of unavoidable relative movements between the housing parts produced by vibration.

SUMMARY OF THE INVENTION

It is an object of the invention to provide a seal which is arranged between the housing parts of a muffler and which provides a satisfactory seal having a high resistance also at high temperatures.

The seal unit of the invention is for a muffler having two housing parts conjointly defining a partition interface with the seal unit establishing a seal between the parts when mounted at the interface. The seal unit includes: a first layer being substantially in the form of a frame defining a plane; a plurality of lugs extending from and being integral with the frame; the lugs defining a second layer formed by being folded out of the plane and onto the first layer; and, the lugs and the frame being made of sheet steel.

The arrangement of a two-layer sheet-steel seal has a very high stability especially when used on mufflers. The frame of the sheet-steel seal lies in contact engagement with one sealing surface and the lugs configured so as to be integral with the frame lie in contact engagement with the other sealing surface whereby unevenness between the sealing surfaces is substantially compensated. The sheet-steel seal according to the invention has adequate mechanical strength to resist the gas pulsations of the muffler. It has been shown that a seal formed with the sheet-steel seal of the invention is resistant even at high temperatures of approximately 550° C. The vibrations present in a muffler and the unavoidable relative movements between the housing parts which are associated therewith do not lead to an early failure of the sheet-steel seal according to the invention.

The lugs are preferably resiliently connected with the frame so that an occurring warpage induced by temperature or occurring gap changes induced by the vibrations can be compensated for. In its new condition, the free edges of the folded lugs are therefore at a small spacing to the remaining seal body.

According to another feature of the invention, the lugs are provided at the outer edge of the frame with the lugs being connected with the frame via a round after folding with the round defining the outer edge of the seal. The gap between the lug and the frame faces the interior space of the muffler so that occurring gas pulsations tend to press the lugs apart. In this way, an increased surface contact engagement on the sealing surfaces of the housing halves is obtained whereby the seal is improved.

According to another feature of the invention, the lugs extend from the inner edge of the frame and are folded outwardly with the rounds defining the inner edge of the seal and with the rounds connecting the lugs to the frame. This inner edge lies facing toward the inner space of the muffler whereby an especially good seal is obtained.

In a further embodiment of the invention, lugs are provided on the outer edge as well as on the inner edge of the frame with the inner lugs extending beyond the outer lugs or vice versa. In this way, a three-layer sheet-steel seal is provided which can withstand even the highest stresses.

According to a further embodiment of the invention, the outer lugs are longer than the inner lugs. The width of the lugs is preferably slightly less than the width of the frame.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
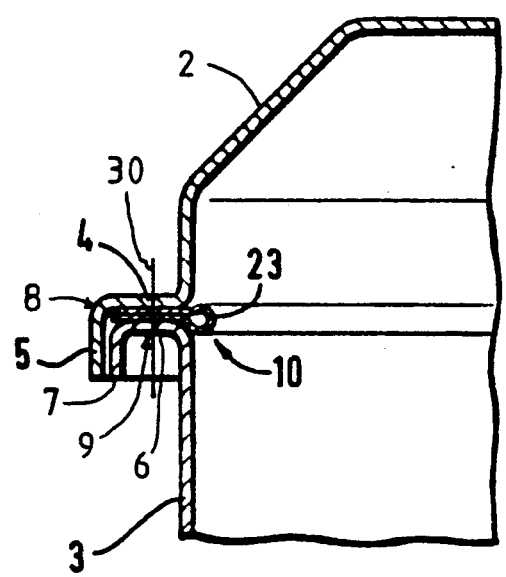
FIG. 1a is a partial section view of a muffler showing a first embodiment of the seal.

The muffler shown in FIG. 1a includes two housing parts (2 and 3) which are configured as half-shells. The half-shell 2 has an outer rim 8 comprising a flange 4 bent over outwardly and an outer leg 5 of the flange 4 is bent over in the direction toward the second half-shell 3. The second half-shell 3 has a rim 9 which includes a flange 6 bent outwardly and essentially parallel to flange 4 of the first half-shell 2. The outer leg 7 of the flange 6 is bent over backwardly toward the half-shell 3.

The rim 8 of the first half-shell 2 overlaps the rim 9 of the second half-shell 3. The sides of the flanges 4 and 6 facing toward each other define the sealing surface of the half-shells (2 and 3).

The muffler 1 has essentially a square-like basic form with the two half-shells (2 and 3) being tightly connected to each other by threaded fasteners passing through the rims (8 and 9). The threaded fasteners are preferably seated in the four corners of the rims (8 and 9) lying in the partition plane or the muffler 1. One of the threaded fasteners is represented schematically by line 30 in FIG. 1a.

A seal 10 is placed between the housing parts or half-shells (2 and 3) to obtain a reliable seal. According to a feature of the invention, this seal is made of sheet steel folded in at least two layers. Preferably, a very heat-resistant sheet steel having a thickness of 0.1 mm is used.

Figure 2:
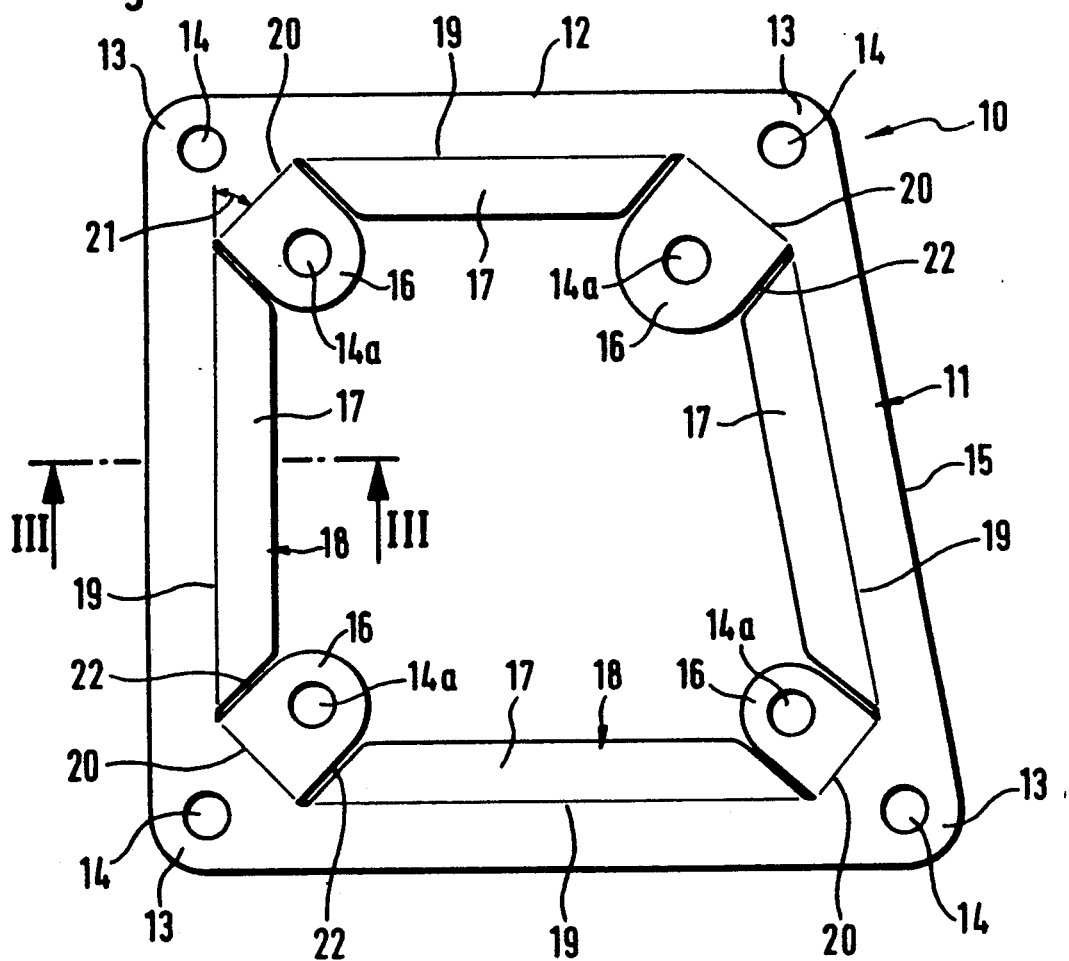
FIG. 2 is a plan view of a blank of the sheet-steel seal according to the first embodiment thereof.

A first embodiment of the sheet-steel seal 10 is shown in the form of a blank in FIG. 2. The seal is made of a stamped steel sheet having a main frame 11 which in its dimensions corresponds to the sealing surface lying at the partition plane between the half-shells (2 and 3). The main frame and the sealing surface have essentially a quadratic base form with a shortened side 12. Openings 14 are provided in the corners 13 of the main frame 11 for the attaching screws which project through the rims (8 and 9) of the half-shells (2 and 3). The outer-lying edge 15 of the main frame 11 is rounded in the region of the corners 13.

An inner frame 18 extends from the inner edge of the main frame 11 and is configured so as to be integral with the main frame 11. The inner frame 18 is cut in the region of the corners such that four corner lugs 16 are formed and elongated lugs 17 extend between each two of the corner lugs 16 so that a total of four elongated lugs 17 are provided having a width which is slightly less than the width of the frame 11.

The corner lugs 16 and the elongated lugs 17 are folded outwardly in a direction toward the main frame 11. The inner edges 19 of the main frame extend in the longitudinal direction of the sealing sides. The inner edges 19 then form the folding lines for the elongated lugs 17. The corner lugs 16 are bent about the folding lines 20 and these folding lines lie at an angle 21 of preferably 45° to the fold lines 19 of the elongated lugs 17. Openings are punched out in the corner lugs 16 and these openings 14a overlap in alignment with the openings 14 after folding.

The cut lines 22 separate the elongated lugs 17 from the corner lugs 16 and are preferably at an angle of 45° to the folding line 19 corresponding thereto referred to the elongated lug 17.

In the folded condition of the seal (FIG. 3), the main frame 11 and the lugs (16 and 17) of the inner frame 18 are resiliently connected with each other via a round 23 of approximately 0.5 mm. In the new condition of the seal 10, at least the elongated lugs 17 of the inner frame 18 are at a narrow spacing (u) to the main frame 11 with this spacing being preferably less than the round 23.

As shown in FIG. 1a, the seal 10 lies so that its round 23 faces toward the interior of the muffler 1. The main frame and the lugs lie elastically deformed against the respective sealing surfaces of the flanges (4 and 6) which are adjacent thereto when the half-shells (2 and 3) are joined together with the threaded fasteners. A compensation for gaps is provided when there is temperature-induced distortion or warpage because of the elastic contact engagement of the seal 10 on the corresponding sealing surfaces. The resilient yielding capability of the seal 10 of the invention assures a reliable seal even with the vibrations occurring in the muffler 1 and without mechanical wear. The sheet-steel seal 10 is highly temperature resistant because of the material.

Figure 3:
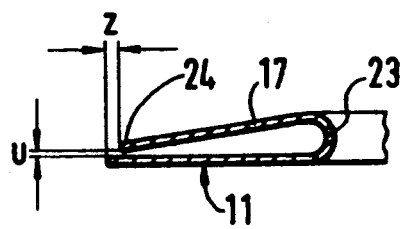
FIG. 3 is a section view of the seal of FIG. 2 taken along line III—III for the condition wherein the seal has been folded.
Figure 4:
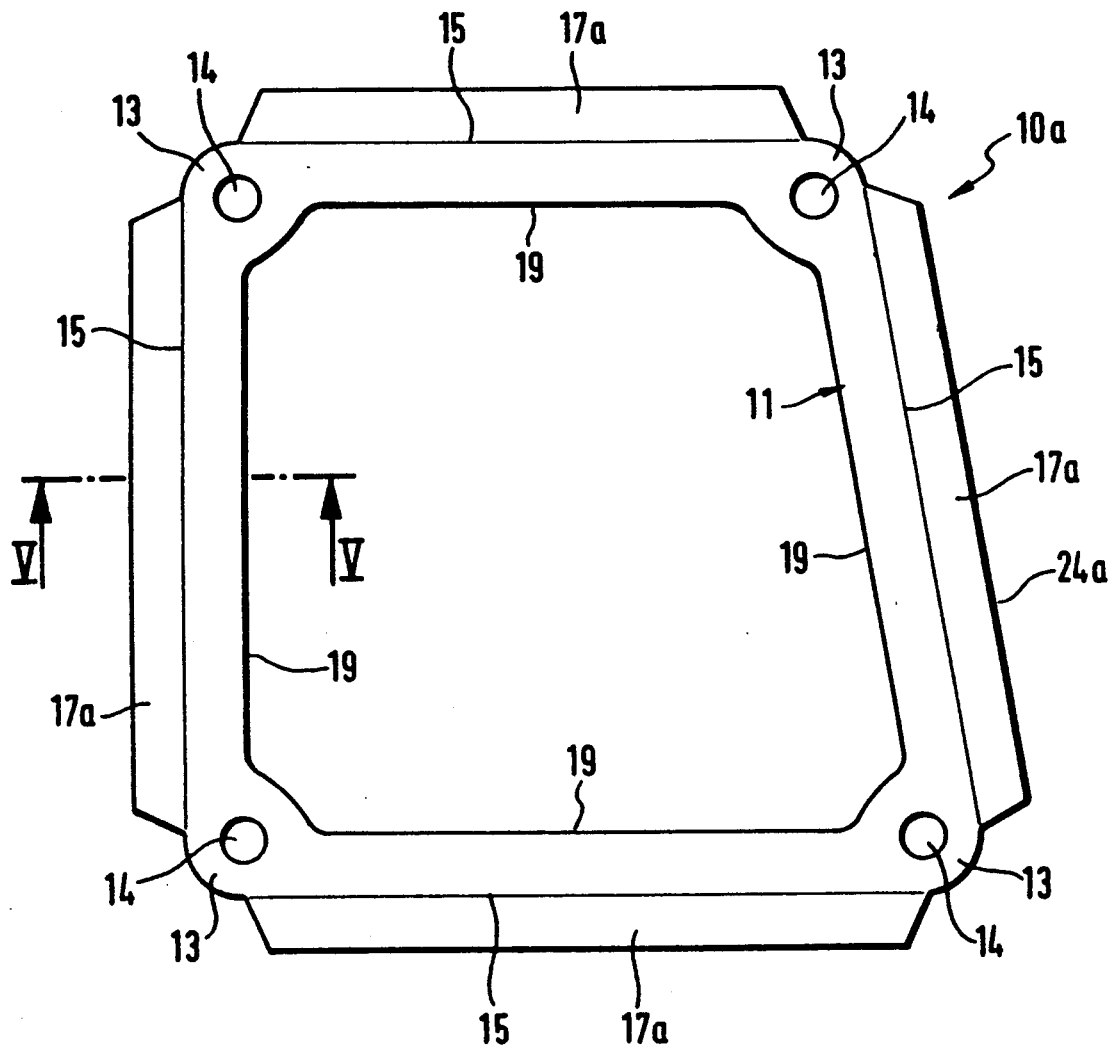
FIG. 4 is a plan view of a blank of another sheet-steel seal according to the second embodiment.

FIG. 4 shows a blank of a simplified embodiment of a sheet-steel seal 10a according to the invention. The main frame 11 corresponds in its basic form to the main frame of the embodiment of FIG. 2 and for this reason the same parts are identified by like reference numerals. Elongated lugs 17a extend from the outer edge 15 of the main frame. The lugs 17a are folded inwardly about the longitudinal edges 15 which act as folding lines. In this way, a round 23a (FIG. 5) is provided which lies outwardly. The edge 24a lying inwardly is at a spacing (u) from the main frame 11. In correspondence to the folded sheet-steel seals according to FIGS. 2 and 3, the free longitudinal edge 24a in the embodiment of FIG. 4 is offset outwardly at a spacing (z) from the inner edge 19 of the main frame 11.

The elongated lugs 17a (FIG. 4) extend essentially from edge 13 to edge 13 with these corners being cut such that the elongated lugs 17a, which are folded resiliently inwardly, leave the openings 14 free for passing threaded fasteners therethrough. This does provide a small area in the region of the corners where the seal has only one layer; however, high surface pressing forces are present in the region of the threaded fasteners so that no significant leakage occurs. The length of the elongated lugs 17a is further so dimensioned that they lie close to each other at their ends when in the folded condition. The elongated lugs 17a have a width which is slightly less than the width of the main frame 11.

Figure 1B:
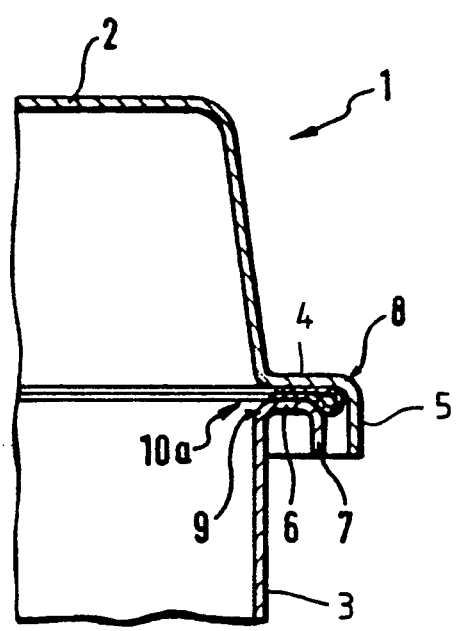
FIG. 1b is a partial view showing a second embodiment of the sheet-steel seal.
Figure 5:
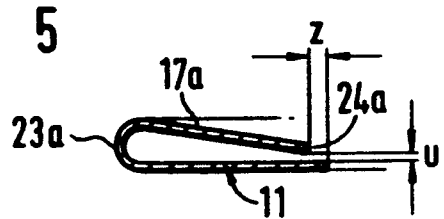
FIG. 5 is a section view of the seal of FIG. 4 taken along line V—V for the condition wherein the seal has been folded.

The arrangement of the sheet-steel seal 10a according to FIGS. 4 and 5 is shown mounted in the muffler shown in FIG. 1b.

Figure 6:
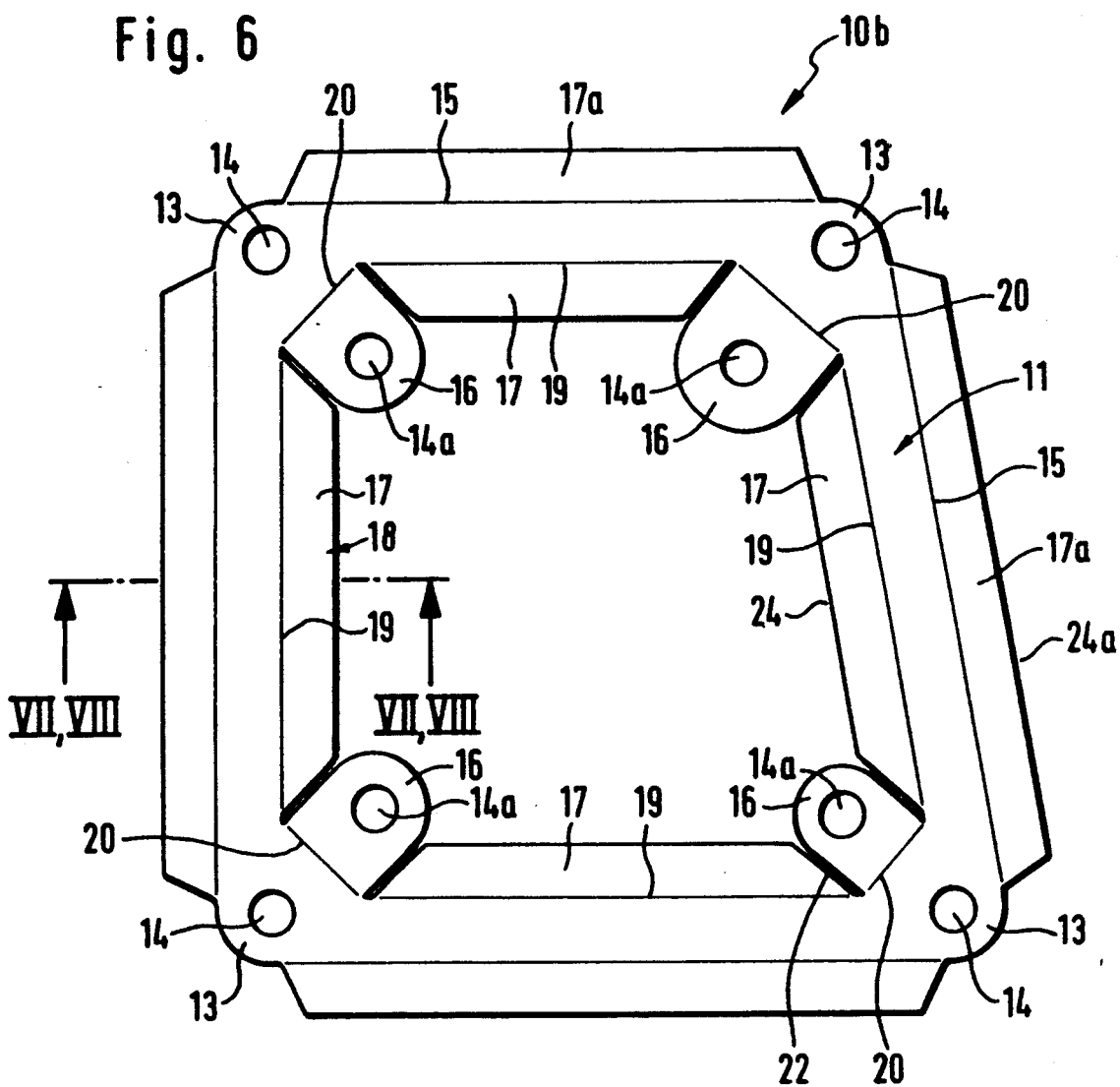
FIG. 6 is a plan view of a blank of a third embodiment of the sheet-steel seal.
Figure 7:
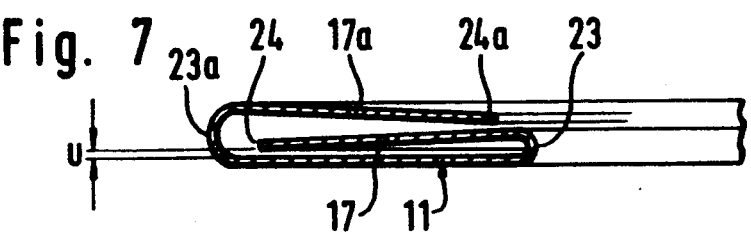
FIG. 7 is a section view taken along line VII—VII of the sheet-steel seal of FIG. 6 for the condition wherein the seal is folded pursuant to a first fold embodiment; and, FIG. 8 is a section view taken along line VIII—VIII of the sheet-steel seal of FIG. 6 for the condition wherein the seal is folded pursuant to a second fold embodiment.
Figure 8:
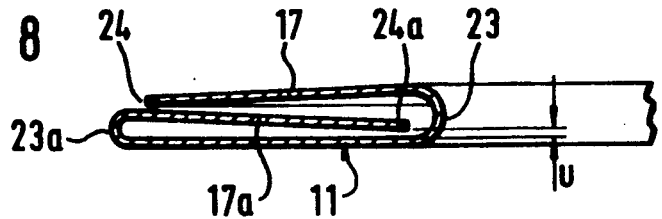

According to another embodiment of the invention shown in FIGS. 6 to 8, the seals shown in FIGS. 2 and 3 and in FIGS. 4 and 5 are combined to form a three-layer seal 10b. As shown in FIG. 4, the main frame 11 has elongated lugs 17a extending from its outer edge 15. The elongated lugs 17a are folded inwardly about the outer edge 15 defining a folding line. Furthermore, the main frame has an inner frame 18 integral therewith corresponding to that shown in FIG. 2. The corner lugs 16 are folded outwardly about folding lines 20 while the inner elongated lugs 17 are folded outwardly about the inner edges of the main frame 11 defining respective folding lines.

According to a first folding mode, the blank of FIG. 6 is folded such that first the elongated lugs 17 and the corner lugs 16 of the inner frame 18 are folded outwardly and thereafter, the outer-lying elongated lugs 17a are bent over inwardly. FIG. 7 is a section view showing the folding profile of this folding mode.

Referring to FIG. 7, the main frame 11 extends via round 23a into the folded-over outer elongated lug 17a and via round 23 into the folded lug 17 of the inner frame 18. In this embodiment also, the free edges 24 of elongated lugs 17 and the free edges 24a of elongated lugs 17a lie between the outer edge 15 and the inner edge 19 of the main frame 11. As mentioned with respect to the embodiments described above, in order to obtain the required elasticity, the free longitudinal edge 24 of the inner elongated lug 17 lies at a spacing (u) to the main frame 11; whereas, the free longitudinal edge 24a of the outer longitudinal lug 17a lies at a narrow spacing to the folded-over elongated lug 17 of the inner frame 18.

The folding sequence of the folding according to FIG. 8 can be changed; that is, each outer elongated lug 17a is first folded over inwardly and, thereafter, the inner frame 18 including the lugs (16 and 17) is folded outwardly. If the folding sequence is changed in this manner, then the round 23 of the seal profile which results therefrom faces the interior of the muffler 1 as shown in FIG. 1a. In this embodiment also, the free edges 24 of the elongated lugs 17 lie at a narrow spacing to the elongated lugs 17a and the free edges 24a of the elongated lugs 17a are at a narrow spacing to the main frame 11 so that adequate elasticity of the seal perpendicular to the sealing surface is assured. When the housing halves are fastened together with threaded fasteners, a resilient surface contact to the individual sealing surfaces results thereby providing an excellent seal. The seal described above has a high resistance to temperature and low mechanical wear. Furthermore, and with respect to the surfaces to be sealed, the seal described above provides compensation for temperature-induced warpage and vibrations which occur.

It is understood that the foregoing description is that of the preferred embodiments of the invention and that various changes and modifications may be made thereto without departing from the spirit and scope of the invention as defined in the appended claims.

What is claimed is:

1. A muffler for a hot pulsating gas flow, the muffler comprising:
   two half shells having respective peripheral rims conjointly defining a partition interface extending around the periphery of the muffler;
   a plurality of fasteners spaced one from the other along said periphery so as to pass through and hold said rims and therefore said half shells tightly together;
   said rims having respective mutually adjacent flanges for defining said interface;
   a seal unit made of sheet steel and being disposed at said interface between said flanges for establishing a seal between said half shells; the seal unit including:
   a first layer being substantially in the form of a frame defining a plane and having apertures formed therein to accommodate corresponding ones of said fasteners;
   a plurality of sealing lugs separated one from the other and extending from and being integral with said frame;
   said lugs defining a second layer formed by being folded out of said plane and onto said first layer;
   each of said lugs and said frame conjointly defining a round where the lug is folded onto said first layer to resiliently connect the lug to the frame and to cause the lug to resiliently press against one of said flanges to effect a seal against said flange; and,
   said frame having a first width and said lugs having a second width less than said first width.

2. The muffler of claim 1, each of said rounds having a diameter of approximately 0.5 mm.

3. The muffler of claim 1, said frame having an inner edge and an outer edge and said lugs having a free edge disposed at a narrow vertical spacing (u) away from said frame and within said inner and outer edges when viewed in plan.

4. The muffler of claim 1, said frame having an inner edge; and, said lugs extending from said inner edge and being folded over onto said frame so as to cause said rounds to define the inner periphery of said seal unit.

5. The muffler of claim 1, said frame having an outer edge; and, said lugs extending from said outer edge and being folded over onto said frame so as to cause said rounds to define the outer periphery of said seal unit.

6. The muffler of claim 1, said frame having inner and outer edges; said plurality of lugs being a first plurality of lugs extending from said inner edge and being folded over onto said frame so as to cause said rounds to define the inner periphery of said seal unit and said seal unit further comprising: a second plurality of lugs extending from said outer edge; a second plurality of rounds connecting corresponding ones of the lugs of said second plurality of lugs to said frame; and, said second plurality of lugs being folded to overlap corresponding ones of said first plurality of lugs.

7. The muffler of claim 6, the lugs of said second plurality of lugs being longer than the lugs of said first plurality of lugs.

8. The muffler of claim 1, said frame having inner and outer edges; said plurality of lugs being a first plurality of lugs extending from said outer edge and being folded over onto said frame so as to cause said rounds to define the outer periphery of said seal unit and said seal unit further comprising a second plurality of lugs extending from said inner edge; a second plurality of rounds connecting corresponding ones of the lugs of said second plurality of lugs to said frame; and, said second plurality of lugs being folded to overlap corresponding ones of said first plurality of lugs.

9. The muffler of claim 8, the lugs of said second plurality of lugs being longer than the lugs of said first plurality of lugs.

10. The muffler of claim 1, said frame having a plurality of inner corners, said seal unit further comprising a plurality of corner lugs extending from corresponding ones of said inner corners and being folded out of said plane and onto said frame.

11. The muffler of claim 1, said sheet steel having a thickness of approximately 0.10 mm.

12. The muffler of claim 1, each two mutually adjacent ones of said fasteners defining a spacing therebetween; and, each of said lugs extending over substantially the entire spacing corresponding thereto when folded onto said first layer.

13. A muffler for a hot pulsating gas flow, the muffler comprising:
   two half shells having respective peripheral rims conjointly defining a partition interface extending around the periphery of the muffler;
   a plurality of fasteners spaced one from the other along said periphery so as to pass through and hold said rims and therefore said half shells tightly together;
   said rims having respective mutually adjacent flanges for defining said interface;
   a seal unit made of sheet steel and being disposed at said interface between said flanges for establishing a seal between said half shells; the seal unit including:
   a first layer being substantially in the form of a frame defining a plane and having apertures formed therein to accommodate corresponding ones of said fasteners;
   a plurality of sealing lugs separated one from the other and extending from and being integral with said frame;
   said lugs defining a second layer formed by being folded out of said plane and onto said first layer; and,
   each of said lugs and said frame conjointly defining a round where the lug is folded onto said first layer to resiliently connect the lug to the frame and to cause the lug to resiliently press against one of said flanges to effect a seal against said flange.

* * * * *